US012805667B2

(12) United States Patent
Holcomb et al.

(10) Patent No.: US 12,805,667 B2
(45) Date of Patent: Nov. 24, 2026

(54) SPICE MILL

(71) Applicant: Design Bunker, Inc., Seattle, WA (US)

(72) Inventors: David Holcomb, Seattle, WA (US); Joshua Stewart, Edmonds, WA (US)

(73) Assignee: DESIGN BUNKER, INC., Seattle, WA (US)

( * ) Notice: Subject to any disclaimer, the term of this patent is extended or adjusted under 35 U.S.C. 154(b) by 375 days.

(21) Appl. No.: 18/657,202

(22) Filed: May 7, 2024

(65) Prior Publication Data

US 2024/0374084 A1 Nov. 14, 2024

Related U.S. Application Data

(60) Provisional application No. 63/501,871, filed on May 12, 2023.

(51) Int. Cl.

| | |
|---|---|
| ***A47J 42/14*** | (2006.01) |
| ***A47J 42/04*** | (2006.01) |
| ***A47J 42/08*** | (2006.01) |
| ***A47J 42/18*** | (2006.01) |
| ***A47J 42/20*** | (2006.01) |
| *A47J 42/10* | (2006.01) |

(52) U.S. Cl.
CPC ............... *A47J 42/14* (2013.01); *A47J 42/18* (2013.01); *A47J 42/20* (2013.01); *A47J 42/04* (2013.01); *A47J 42/08* (2013.01); *A47J 42/10* (2013.01)

(58) Field of Classification Search
CPC .. A47J 42/04; A47J 42/08; A47J 42/10; A47J 42/14; A47J 42/18; A47J 42/20; A47J 42/24; A47J 42/34; B02C 7/14; B02C 7/186
See application file for complete search history.

(56) References Cited

U.S. PATENT DOCUMENTS 3,761,027 A * 9/1973 Mendoza .................. B02C 7/12 241/261.3
4,034,921 A * 7/1977 Schnitzer ................ B02C 7/184 241/261.3
5,176,329 A * 1/1993 De Coster ............... A47J 42/08 241/259
5,531,385 A * 7/1996 Witsken .................... B02C 7/13 241/261.3

(Continued)

FOREIGN PATENT DOCUMENTS

EP 2286698 A1 * 2/2011 ............. A47J 31/42
WO 2005/104919 A1 11/2005

*Primary Examiner* — Jared O Brown
(74) *Attorney, Agent, or Firm* — Seed Intellectual Property Law Group LLP

(57) ABSTRACT

A spice mill includes a main body with an internal cavity and a cap removably coupled to the main body to selectively provide access to the internal cavity. A drive shaft extends at least partially through the main body, with the cap transferring rotational motion to the drive shaft. A first grind stone is coupled to the main body and a second grind stone is coupled to the drive shaft. An adjuster assembly is at least partially received in the second grind stone to vary a size of a gap between the first and second grind stones. The second grind stone rotates relative to the first grind stone to grind a material received from the main body and output the ground material through the gap on sides of the spice mill.

20 Claims, 10 Drawing Sheets

(56) References Cited

U.S. PATENT DOCUMENTS

| | | | | |
|---|---|---|---|---|
| 6,164,574 | A * | 12/2000 | Weibel | A47J 42/20 241/168 |
| 7,699,252 | B2 | 4/2010 | Wu | |
| 10,843,199 | B2 | 11/2020 | Munkel et al. | |
| 2005/0184177 | A1* | 8/2005 | Blouse | A47J 42/04 241/169.1 |
| 2008/0093489 | A1* | 4/2008 | Hadj-Chikh | A47J 42/08 241/169.1 |
| 2010/0276527 | A1 | 11/2010 | Park et al. | |
| 2019/0269277 | A1 | 9/2019 | Larose | |
| 2021/0100398 | A1 | 4/2021 | Cha et al. | |
| 2021/0204755 | A1* | 7/2021 | Granot | A23N 12/12 |
| 2021/0228027 | A1 | 7/2021 | Jana et al. | |
| 2022/0257045 | A1 | 8/2022 | Hensel et al. | |

* cited by examiner

SPICE MILL

BACKGROUND

Technical Field

The present disclosure is generally directed to spice mills and more particularly, but not exclusively, to spice mills for improved grinding of pepper and other spices and materials.

Description of the Related Art

Spice mills are generally known. A traditional example is a mortar and pestle that allows for grinding spices by hand in a bowl or mortar with a handheld tool or pestle. A mortar and pestle is known to have a number of drawbacks, including that they involve substantial manual input by the user, are difficult to clean, and are often not suitable for grinding small amounts of a spice, such as fresh pepper for seasoning a meal. Grain mills are also known, with one example being mills that grind a variety of grains with stones. Grain mills have similar deficiencies, such as a large size that is not suitable for grinding small amounts of spice and require substantial manual input from a user. In response, other conventional spice mills have been introduced, including pepper and spice mills. Conventional pepper and spice mills may include rotary action that grinds pepper with less manual input from the user and in smaller quantities that are suitable for many applications. Some typical pepper mills are also adjustable to vary the grind size of the pepper output by the mill.

However, known pepper and spice mills have a number of deficiencies. For example, a traditional pepper mill can be overtightened past a safe point such that the grind features contact each other, resulting in wear of the grind elements and other possible disadvantages. In addition, known pepper grinders may not have an adjustable grind size, or where the grinders are adjustable, do not produce consistent results. Known pepper mills may also release ground pepper at the bottom of the mill resulting in narrow application to a food product, or the ground pepper is collected in a container that results in inconsistent application and additional cleaning of component parts of the spice mill. When a conventional pepper mill is set down, such as on a table, pepper dust typically falls out onto the tabletop, thus requiring additional cleaning.

Accordingly, it would be beneficial to have a spice mill that overcomes the deficiencies of known spice mills.

BRIEF SUMMARY

The present disclosure is generally directed to spice mills for the improved grinding of pepper and other spices. In one example, a spice mill or grinder is provided that may be particularly advantageous for grinding pepper and includes a main body that is hollow, or has an internal cavity open at both ends. A drive shaft extends at least partially through the internal cavity of the main body. A plug is coupled to the drive shaft at the top of the main body, with the plug including an outer surface with channels and one or more internal openings leading into the internal cavity of the main body. A cap is removably coupleable to the plug with the cap including a socket that engages the channels of the plug to transfer rotary motion of the cap to the drive shaft. A spring and an agitator are coupled to the drive shaft. The agitator rotates with the rotation of the drive shaft to assist with distribution of the material received in the internal cavity of the main body.

The spice mill further includes a first grind stone that may be fixedly coupled to the main body and a second grind stone that may be rotatably coupled to the main body by the drive shaft. The first grind stone includes at least one opening through which the material to be ground passes to be ground by the first and second grind stones. The first and second grind stones may have a similar, but inverse pattern of channels cut into their respective grinding surfaces such that rotation of the second grind stone relative to the first grind stone produces a shearing action that grinds the material into a ground material. An adjuster assembly is at least partially received in the second grind stone and includes an adjuster bar, an adjuster core, an adjuster base, and a click spring that assist with varying a size of the gap between the first and second grind stones. The spring on the drive shaft applies a force or pressure that tends to bias the second grind stone into contact with the adjuster assembly.

The ground material is output from the spice mill through the gap between the first and second grind stones, or in other words, is output from an outer side surface of the spice mill instead of at the bottom in order to improve distribution of the ground material toward a food item. Further, the first and second grind stones may each have a grind surface facing each other that are flat and planar with channels cut into the grind surfaces such that contact between the grind stones will not produce wear or result in burrs or chips in the grind stone that are output with the grind material. The inverse pattern of the grind stones increases the shearing action between the stones and assists with providing consistent grind results. Further, the grind stones may include protrusions or islands restricting a size of the material output from the stones to further assist with consistent grinding.

Another example of a spice mill is particularly advantageous for grinding a wider variety of materials or spices, including materials with different sizes. The spice mill includes a main body with an internal cavity and a side surface. A cup for collecting ground material is removably coupled to the main body and surrounds at least a portion of the side surface of the main body. An upper core is coupled to the main body and includes a first opening and first grind teeth. A first grind stone is coupled to the main body and includes a second opening as well as a grinding surface. A lower core is coupled to the cup and includes a protrusion extending through the first opening and the second opening of the upper core and the first grind stone, respectively, with protrusion including second grind teeth. A second grind stone is coupled to the lower core. In some variations, the upper core and first grind stone are a single, unitary component or are separate pieces that are coupled together. Similarly, the lower core and the second grind stone may be a single, unitary component or may be separate pieces.

Material to be ground, such as spices, are received in the internal cavity in the main body and pass through the first and second openings in the upper core and first grind stone, respectively, to contact the protrusion of the lower core. The first and second teeth of the upper and lower core perform an initial grinding action on the material to produce a coarse ground material in response to rotation of the main body by the user. The coarse ground material passes through to the first and second grind stones, which further grind the coarse ground material into a fine ground material and output the fine ground material through a gap between the stones for collection in the cup. The spice mill may further include a plug with bristles that is received in the internal cavity at the top of the main body to enclose the internal cavity during grinding, but is removable between uses to provide access to the internal cavity and also enable cleaning of the spice mill between uses with the bristles of the plug.

Other features and advantages of the spice mills contemplated herein will be described below.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

FIG. 2 is a diametric cross-sectional view of the spice mill of FIG. 1 along line 2-2 in

FIG. 1.

DETAILED DESCRIPTION

Persons of ordinary skill in the art will understand that the present disclosure is illustrative only and not in any way limiting. Other embodiments of the presently disclosed systems and methods readily suggest themselves to such skilled persons having the assistance of this disclosure.

Each of the features and teachings disclosed herein can be utilized separately or in conjunction with other features and teachings to provide spice mill or spice grinder devices, systems, and methods. Representative examples utilizing many of these additional features and teachings, both separately and in combination, are described in further detail with reference to attached FIGS. 1-10. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are exactly to scale and intended to limit the dimensions and the shapes of the components.

While the following description will describe certain non-limiting examples of spice mills or spice grinders, it is to be appreciated that the concepts of the disclosure can be applied equally to other technologies such as other food grinders or food preparation devices, as well as to technology outside of preparation of food products, if desired. Accordingly, the present disclosure in not limited to spice mills and spice grinders.

Figure 1:
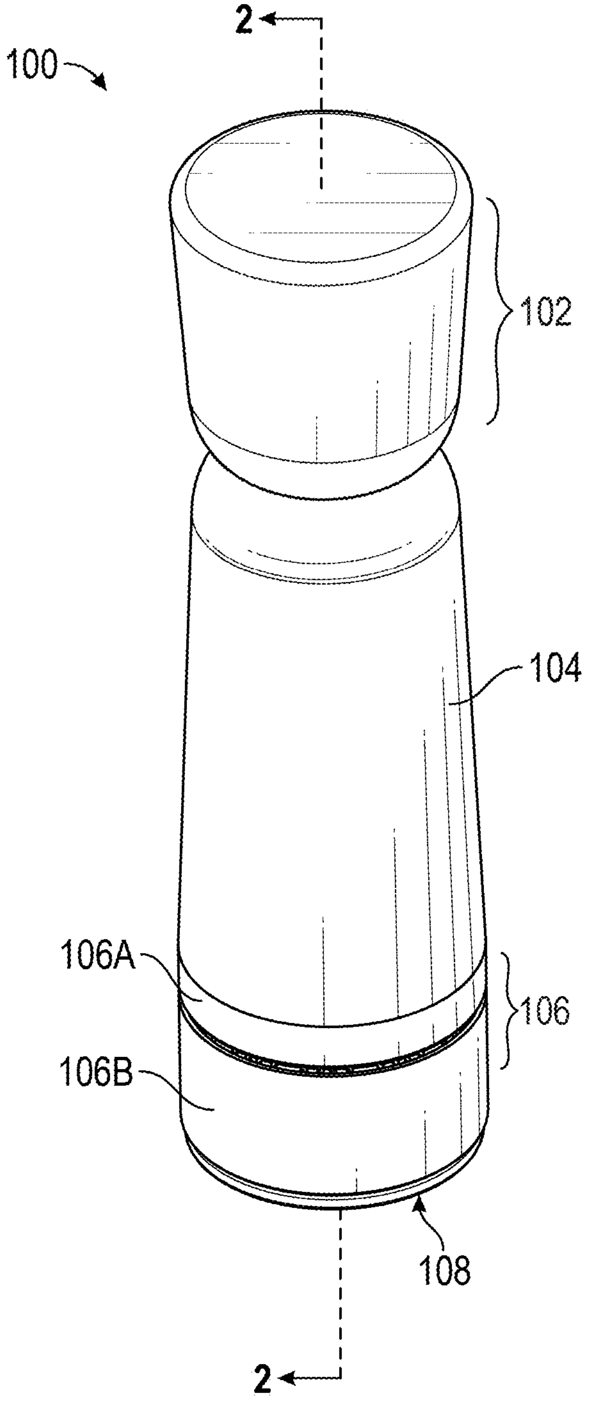
FIG. 1 is an isometric view of an embodiment of a spice mill according to one or more embodiments of the present disclosure.
Figure 2:
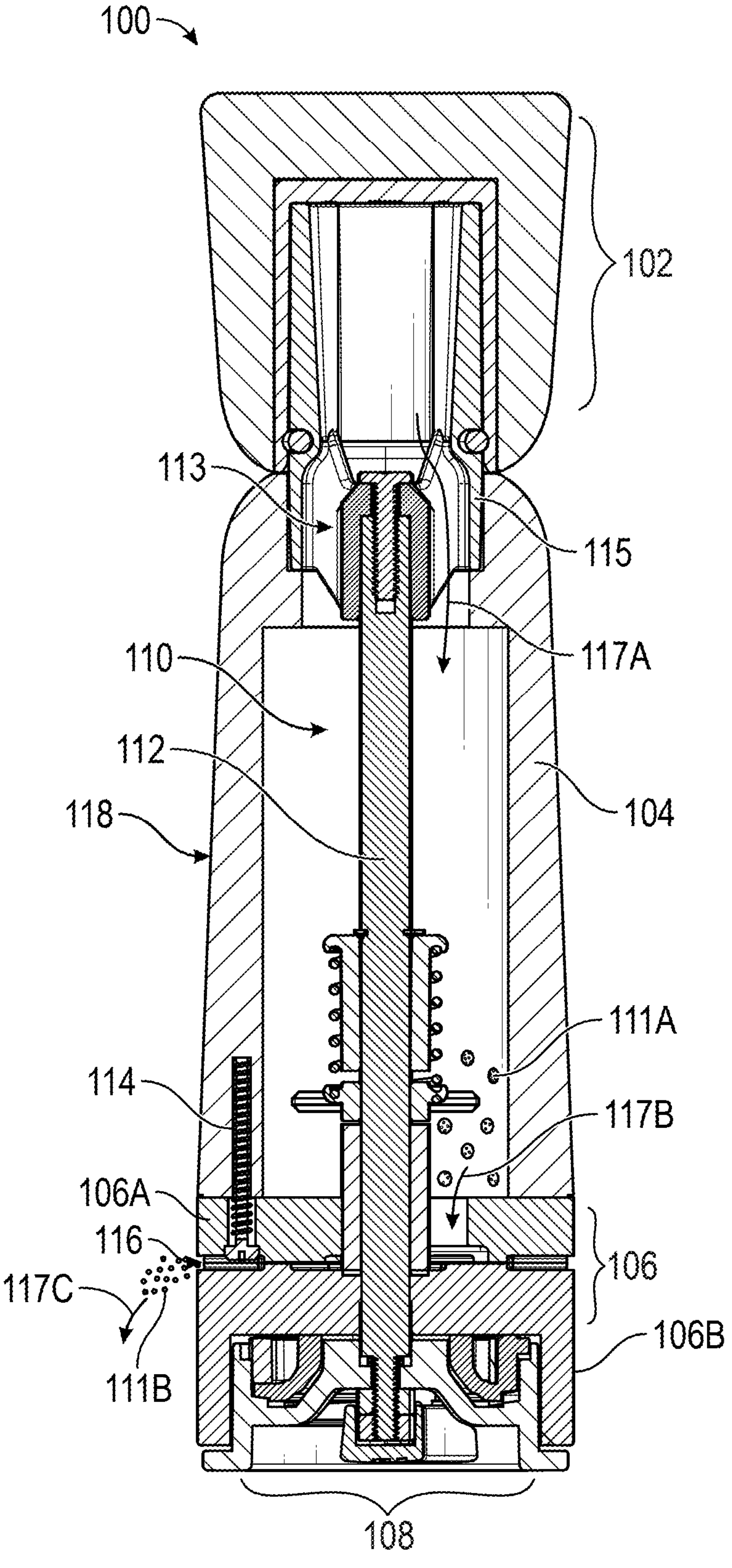

FIG. 1 is an isometric view of one or more embodiments of a spice mill 100 and FIG. 2 is a cross-sectional view of the spice mill 100 along line 2-2 in FIG. 1. With reference to FIG. 1 and FIG. 2, the spice mill 100 generally includes a cap assembly 102 (which may also be referred to herein as a cap 102), a main body 104, a grinding assembly 106 and an adjuster assembly 108. The cap 102 is removably coupled to the main body 104; the grinding assembly 106 includes a first grind stone 106A and a second grind stone 106B; and the adjuster assembly 108 may be at least partially received inside the second grind stone 106B. Although FIG. 1 and FIG. 2 illustrate the spice mill 100 having a generally cylindrical shape with the cap 102 and main body 104 tapering toward and away from, respectively, an interface between the cap 102 and the main body 104, many other configurations of the spice mill 100 are contemplated herein. In general, the spice mill 100 may have any selected outer shape and/or color. Further, the spice mill 100 may be made of a number of different materials, including wood, metal or metal alloys, stone, plastic, and others. Accordingly, the disclosure is not limited to the outer appearance, color, or material for the spice mill 100.

As best shown in FIG. 2, the main body 104 includes an internal cavity 110 that is structured to receive and store a coarse or raw material 111A to be ground, such as pepper or pepper corns, spices, or other material. The spice mill 100 also includes a drive shaft 112 extending at least partially through the main body 104. In an embodiment, the drive shaft 112 is located centrally with respect to a vertical axis passing through a center of the main body 104 and extends from the adjuster assembly 108 at the bottom of the spice mill 100, through both grind stones 106A, 106B, and to a top (or proximate a top) of the main body 104. The grind stones 106A, 106B may instead be referred to as grind components 106A, 106B, grind elements 106A, 106B, or other like terms. In some embodiments, the grind stones 106A, 106B are a stone material, although other suitable materials are contemplated and it is not required that the grind stones 106A, 106B be a stone material. For example, the grind components 106A, 106B may be another type of hard material other than stone, such as at least steel (and other metals and metal alloys), zinc, ceramic, and potentially even hard plastic, polymers, or thermoplastics. Accordingly, the phrases "grind stone," "grind component," and "grind element" may generally be used interchangeably in the following description with the understanding that the following references to a "grind stone" or "grind stones" also refer to "grind components" or "grind elements" that may have a different, but suitable material composition. The second grind stone 106B and the adjuster assembly 108 are coupled and rotationally fixed with respect to the drive shaft 112, while the first grind stone 106A is fixed to the main body 104 with one or more fasteners 114 extending into a sidewall of the main body 104. In an embodiment, the first grind stone 106A is not fixed, but rather, also rotates relative to the main body 104 to assist with grinding.

As will be described in greater detail below, the user can remove the cap 102 and insert a material 111A to be ground into the internal cavity 110 of the main body 110 via holes 113 in a plug 115 coupled to the main body 104 and the drive shaft 112. The user then replaces the cap 102 in engagement with the plug 115 and rotates the cap 102 to rotate the drive shaft 112. The second grind stone 106B rotates together with rotation of the drive shaft 112 to grind the material 111A received from the internal cavity 110 of the main body 104 against the first grind stone 106A (i.e., the grind stones 106A, 106B cooperate to grind the material) and produce a ground material 111B, such as ground pepper or ground spices, among others. Notably, the ground material 111B exits the spice mill 100 from a gap 116 between the first and second grind stones 106A, 106B along an outer side surface 118 of the spice mill 100. In an embodiment, the gap 116 is spaced from a bottom of the spice mill 100 by a thickness of the second grind stone 106B such that the ground material 111B exits from a bottom portion of the outer side surface 118 of the spice mill 100.

Although the ground material 111B is illustrated schematically as exiting from only one side of the spice mill 100, the ground material 111B may be output from all sides (i.e., an entire outer dimension or circumference) of the outer side surface 118 of the spice mill 100 to assist with wider distribution of the ground material 111B. The ground material 111B is also not collected or otherwise restricted in its exit path from the spice mill 100 in an embodiment, meaning that the ground material 111B exits the spice mill 100 entirely and in most cases, directly to a food preparation or other, separate collection vessel. The path of travel of the coarse or raw material 111A and the ground material 111B is generally indicated in sequential order by arrows 117A, 117B, 117C in FIG. 2.

Figure 3:
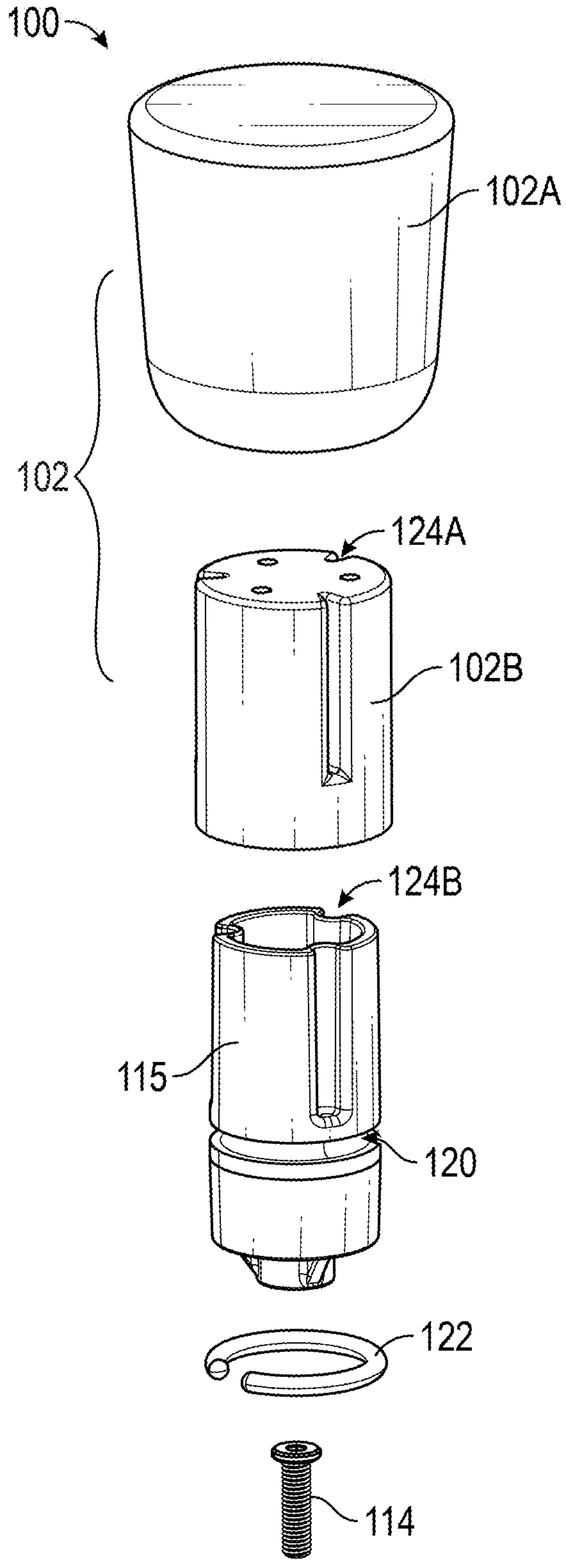
FIGS. 3-5 are partial exploded views of the various portions of the spice mill of FIG. 1.

Turning to FIG. 3, illustrated therein is an exploded view of a top portion of the spice mill 100, and specifically, the cap assembly 102 and the plug 115, among other features. The cap assembly 102 includes a knob 102A and a socket 102B coupled to, and received internal to, the knob 102A, such as with fasteners, adhesive, or the like. The knob 102A can be grasped by the user to operate the spice mill 100, as described herein. The plug 115 is coupled to a top of the main body 104 of the spice mill 100 (FIG. 2) and is structured to receive the cap assembly, and specifically, the socket 102B of the cap assembly 102 to couple the cap assembly 102 to the plug 115 and the main body 104. The plug 115 includes a channel 120 extending at least partially, or entirely, around the plug 115 proximate where the plug 115 extends from the main body 104 of the spice mill 100. The channel 120 receives a snap ring 122 to assist with the removable engagement of the cap assembly with the plug 115 and the main body 104. Further, the socket 102B includes one or more keys 124A that may be implemented as protrusions or indentations extending into an open internal cavity of the socket 102B. The plug 115 includes corresponding keyways 124B implemented as depressions that receive the keys 124A of the socket 102B.

In an embodiment, the socket 102B includes three keys 124A spaced equidistant from each other and the plug 115 includes a corresponding number and arrangement of keyways 124B, although other numbers and configurations of keys 124A and keyways 124B are contemplated herein. In other words, the keys 124A of the socket 102B interface with the keyways 124B of the plug 115 to transfer rotatory motion of the knob 102A and socket 102B to the plug 115. The plug 115 is coupled to the drive shaft 112 with a fastener 114, which may be a screw, bolt, or the like. Thus, rotation of the knob 102A rotates the socket 102B and the plug 115, which in turn rotates the drive shaft 112 (FIG. 2) to grind the material 111A (FIG. 2), as described herein.

Figure 4:
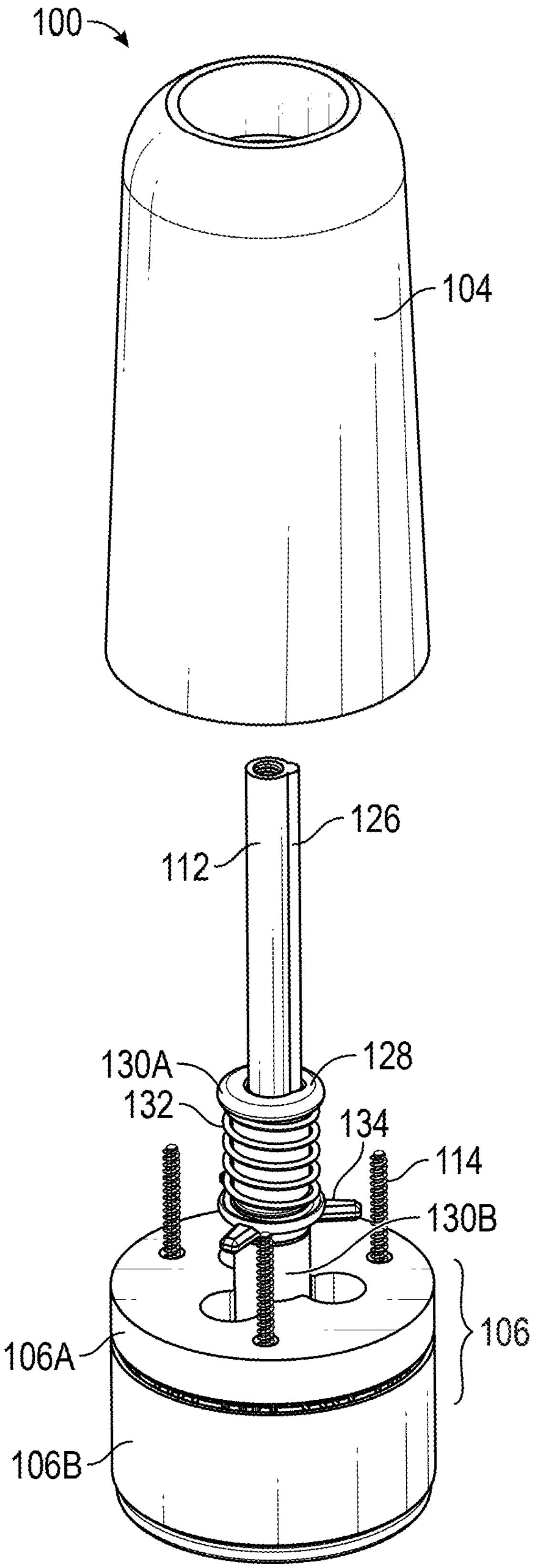

FIG. 4 is an exploded view of a middle portion of the spice mill 100, including the main body 104, the drive shaft 112, and the grind assembly 106. The main body 104 may include the internal cavity 110 (FIG. 2) that is open at both ends in an unassembled configuration, but which is closed at the top by the plug 115 and the cap 102 and at the bottom by the grind assembly 106, and specifically the first grind stone 106A in the assembled configuration in order to retain the material 111A in the internal cavity 110 (FIG. 2). The drive shaft 112 may include a ridge 126 extending along at least a part of, or all of, a length of the drive shaft 112. A clip 128, a first spacer 130A, a spring 132, an agitator 134, and a second spacer 130B are arranged on, and coupled to, the drive shaft 112 with the ridge 126 preventing these features from freely rotating or spinning on the drive shaft. As such, the clip 128, first spacer 130A, spring 132, agitator 134, and second spacer 130B rotate with the rotation of the drive shaft 112 via ridge 126.

The clip 128 is a "C" type clip that is open on one side to hold the spacers 130A, 130B, spring 132, and agitator 134 in place at the top. The first spacer 130A is positioned below the clip 128 and compresses the spring 132 (i.e., a length of the first spacer 130A is less than a length of the spring 132 in a relaxed state such that mounting the spring on the first spacer 130A results in compression of the spring 132) such that the spring 132 exerts a force on the grind assembly 106. The agitator 134 includes one or more arms, such as three equally spaced arms in a non-limiting example, which agitate the material 111A (FIG. 2) as the drive shaft 112 rotates to help with distribution of material 111A to the grind assembly 106. The second spacer 130B assists with holding these features in place at the bottom, and also spaces the agitator 134 from the grind assembly 106 to prevent the agitator 134 from blocking access to the grind assembly 106. The second spacer 130B also assists with the transfer of force from the spring 132 to the second grind stone 106B of the grind assembly 106, as described further below.

Figure 5:
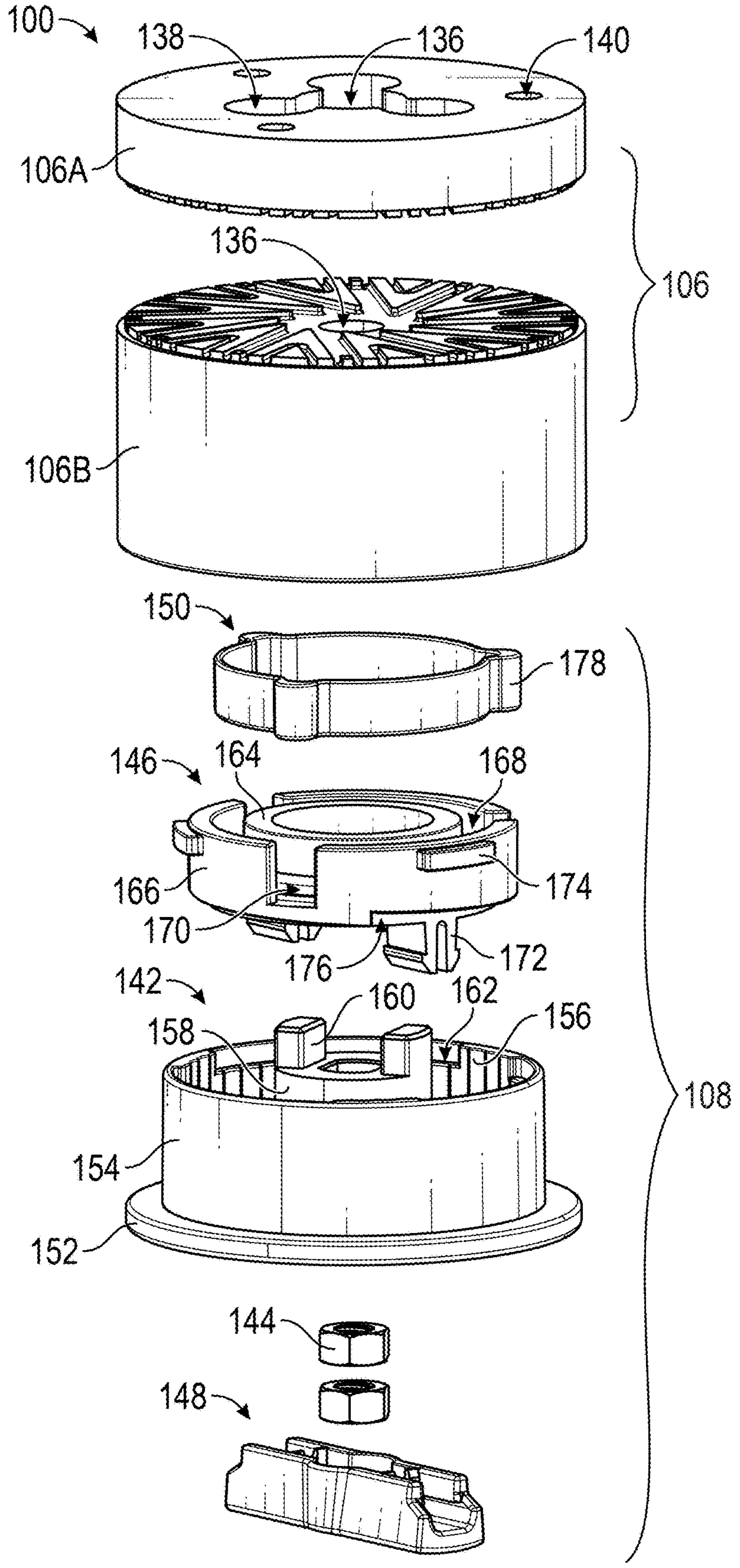

FIG. 5 is an exploded view of a bottom portion of the spice mill 100 including the grind assembly 106 and the adjuster assembly 108. The grind assembly 106 includes the first grind stone 106A and the second grind stone 106B, which may be an upper and lower grind stone, respectively.

The grind assembly 106 includes a central bore 136 extending through both grind stones 106A, 106B, and through which the drive shaft 112 is inserted in the assembly configuration of the spice mill 100 (see FIG. 2). Further, the first grind stone 106A includes one or more openings 138 as well as fastener holes 140. The openings 138 are in communication with the central bore 136 of the first grind stone 106A, meaning that each of the openings 138 leads into the central bore 136 of the first grind stone 106A. Accordingly, the central bore 136 and the openings 138 of the first grind stone 106A may cooperate to define a single, central opening in the first grind stone 106A. In an embodiment, the openings 138 includes three openings spaced equidistant about the central bore 136 of the first grind stone 106A, although other configurations are contemplated herein, such as more or less openings 138 or openings of a different shape. Further, the openings 138 may not be in communication with the central bore 136 of the first grind stone 106A, but could instead be configured as openings or slots through the first grind stone 106A that are separate and spaced apart from the central bore 136 of the first grind stone 106A.

The coarse material 111A (see FIG. 2) passes through the openings 138 in the first grind stone 106A to be ground between the first and second grind stones 106A, 106B. The bore 136 of the first grind stone 106A may also be larger than the bore 136 of the second grind stone 106B to accommodate the second spacer 130B in the bore 136 of the first grind stone 106A. The fastener holes 140 in the first grind stone 106A receive the fasteners 114 to couple the first grind stone 106A to the main body 104 (FIG. 2). At least a bottom portion of the second grind stone 106B may be hollow such that the adjuster assembly 108 is at least partially, or mostly, received inside the second grind stone 106B.

The adjuster assembly 108 includes an adjuster base 142 coupled to the drive shaft 112 with nuts 144, an adjuster core 146 received in, and coupled to, the adjuster base 142, an adjuster bar 148 coupled to the adjuster core 146, and a click spring 150 received in the adjuster core 146. The nuts 144 may include two nuts 144 coupled to a bottom threaded end of the drive shaft 112, where the nuts 144 have reverse or inverse threading relative to each other to prevent the nuts 144 from uncoupling from the drive shaft 112 during rotation of the drive shaft. The nuts 144 are received in a space internal to the adjuster bar 148 in an assembled configuration with clearance between the nuts 144 and the adjuster bar 148 to avoid rotation of the adjuster bar 148 as a result of rotation of the drive shaft 112 in some embodiments.

The adjuster base 142 is an outer body of the adjuster assembly 108 and includes a bottom rim 152 that is in contact with a bottom of the second grind stone 106B in the assembled configuration of the spice mill 100. A sidewall 154 extends from the bottom rim 152 and defines a generally hollow interior of the adjuster base 142. A plurality of teeth or splines 156 extend from an inner surface of the sidewall 154 of the adjuster base 142 to engage the click spring 150. In an embodiment, the teeth or splines 156 extend around an entire circumference of the inner surface of the sidewall 154, although the same is not necessarily required. The adjuster base 142 further includes a central hub 158 coupled to the inner surface of the sidewall 154 with protrusions 160 extending from the central hub 158. The protrusions 160 may include two protrusions spaced from each other on opposite sides of the central hub 158, although other configurations are contemplated herein. The adjuster base 142 also includes cutouts 162 on opposite sides of the adjuster base 142 implemented as sections of the sidewall 154 with a reduced thickness, where the cutouts 162 do not include the teeth or splines 156.

The adjuster core 146 is received in the adjuster base 142 and likewise includes a hub 164 with a central opening that is received on, and in some cases surrounding, the central hub 158 of the adjuster base 142. The hub 164 of the adjuster core 146 cooperates with outer sidewalls 166 of the adjuster core 146 to define a track 168 that receives the click spring 150. The adjuster core 146 further includes spaces 170 in the outer sidewalls 166 as well as adjuster arms 172 extending from a bottom of the adjuster core to engage the adjuster bar 148 in a snap fit connection. Specifically, the adjuster arms 172 include a pair of spaced apart arms with flanges on outer surfaces of the arms that engage corresponds ridges on opposite sides of an internal surface of the adjuster bar 148. When the spaced apart arms are inserted into the adjuster bar 148, the arms are initially forced inward toward each other until the flanges of the arms clear the ridges of the adjuster bar 148, at which point, the arms elastically return to close to their original spacing to maintain engagement between the flanges and ridges. In one or more embodiments, the adjuster core 146 further includes stoppers 174 implemented as protrusions on an upper portion of an outer surface of the outer sidewalls 166 of the adjuster core 146 that are received in cutouts 162 of the adjuster base 154 to prevent over rotation of the adjuster core 146, which in turn, assists with preventing over tightening of the grind stones 106A, 106B. Further, the adjuster core 146 includes a tapered edge 176 on opposite sides of the adjuster core 146 that may be implemented as depressions in a bottom edge of the outer sidewalls 166 of the adjuster core 146. The tapered edge 176 has a height that continuously changes over a length of the tapered edge 176, as shown in FIG. 5.

Finally, the click spring 150 may be implemented as a circular ring received in the track 168 of the adjuster core 146 with ridges 178 that extend through the spaces 170 in the adjuster core 146 to engage the complementary-shaped splines or teeth 158 of the adjuster base 142. The click spring 150 provides feedback to the user during operation of the adjuster assembly, as described further herein, and also provides definite intervals between different grind sizes for selection by the user that assist with providing consistency of the grind size for the ground material 111B (FIG. 2).

Figure 6A:
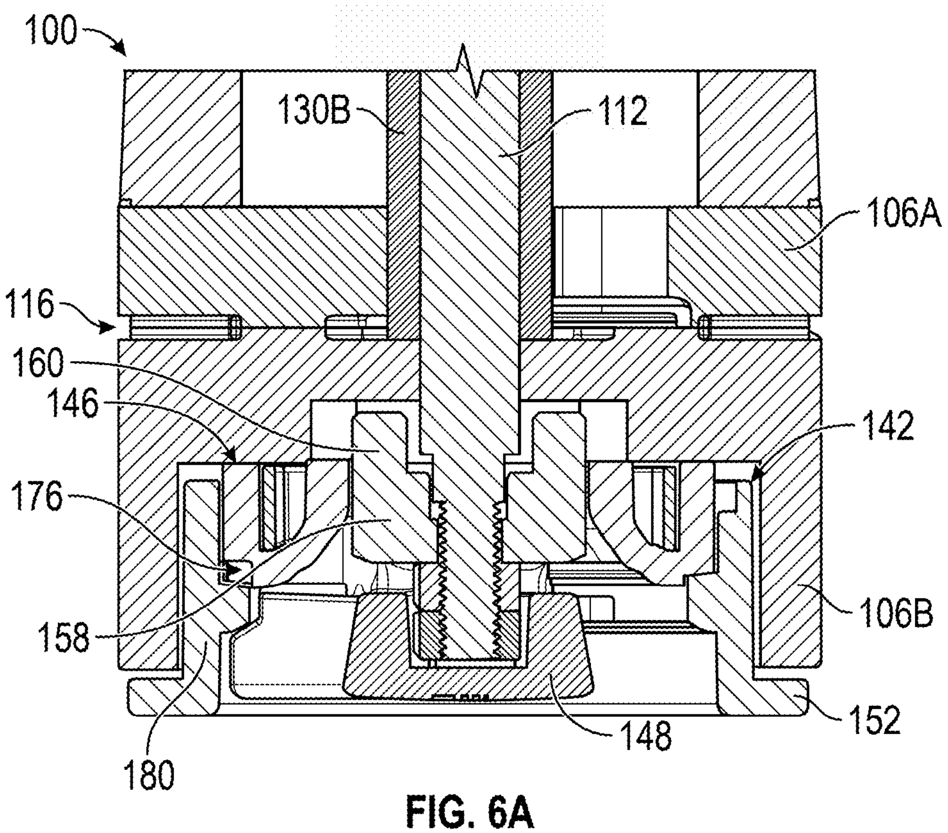
FIG. 6A and FIG. 6B are diametric cross-sectional views of a grinding assembly of the spice mill of FIG. 1 in fine grind and coarse grind configurations, respectively.
Figure 6B:
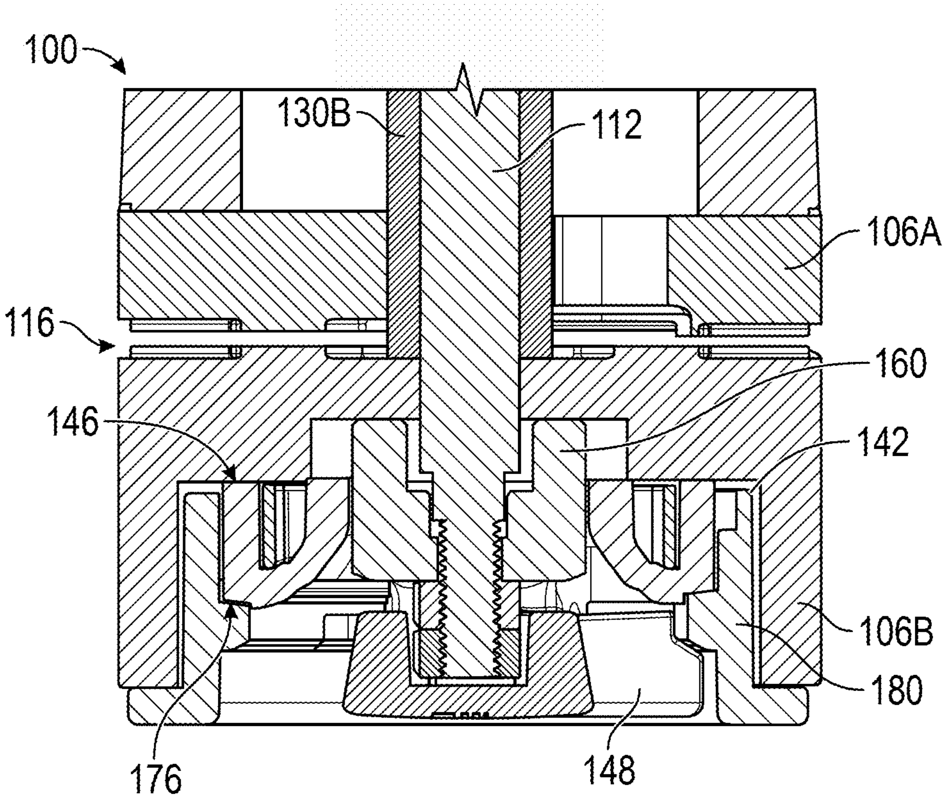

FIG. 6A and FIG. 6B are cross-sectional views of the grinding assembly 106 and adjuster assembly 108 of the spice mill 100 in a fine grind configuration and a coarse grind configuration, respectively. Beginning with FIG. 6A, in the fine grind configuration, the protrusions 160 of the central hub 158 of the adjuster base 142 are spaced from a bottom of the hollow portion of the second grind stone 106B. The bottom of the adjuster core 146 is in contact with a tapered rim 180 of the adjuster base 142. The tapered rim 180 may have a corresponding shape to the tapered edge 176 of the adjuster core 176, as demonstrated in FIG. 6A by the different thickness of the tapered rim 180 on opposite sides of the adjuster base 142. The tapered edge 176 of the adjuster core 146 is spaced from the tapered rim 180 of the adjuster base 142. In other words, the tapered edge 176 is not in contact with the tapered rim 180, but rather, the bottom of the adjuster core 146 is in contact with the tapered rim 180, as shown in FIG. 6A. The second spacer 130B distributes the force provided by the spring 132 (FIG. 4) to the second grind stone 106B to assist with maintaining the coupling between the second grind stone 106B and the adjuster assembly 108. In the fine grind configuration, the adjuster bar 148 may be positioned at one end of its range of motion and the gap 116 between the first and second grind stones 106A, 106B may be as small as 0.2 millimeters ("mm") or more or less, such as 0.00 mm in some configurations. In the fine grind configuration, further rotation of the adjuster bar 148 to bring the grind stones 106A, 106B into contact is prevented by contact between the stoppers 174 of the adjuster core 146 and edges of the cutouts 162 of the adjuster base 142 in some embodiments. Thus, overtightening that results in the grind stones 106A, 106B contacting each other is prevented. In one or more embodiments, the adjuster bar 148 enables the grind stones 106A, 106B to contact each other (i.e., a 0.00 mm gap), but the grind stones 106A, 106B make safe contact that is planar face to planar face (i.e., only flat surfaces of the stones 106A, 106B are in contact), rather than the grinder teeth being in contact as in some known pepper mills. In this way, the spice mill 100 prevents the teeth of the stones 106A, 106B from grinding against each other and outputting stone burrs into a food product.

To adjust the grind assembly from the fine grind configuration in FIG. 6A to the coarse ground configuration shown in FIG. 6B, the user rotates the adjuster bar 148 from the position shown in FIG. 6A to the other end of its range of motion, as shown in FIG. 6B. Notably, there are several intermediate positions for the adjuster bar 148 between the two illustrated extremes such that a variety of grind configurations are possible. In an embodiment, at least 4 different grind sizes are available for selection by the user. Continuing with FIG. 6B, the rotation of the adjuster bar 148 rotates the adjuster core 146 and results in the tapered edge 176 of the adjuster core 146 moving along the tapered rim 180 of the adjuster base 142 to vary a height of the second grind stone 106B with respect to the first grind stone 106A. Specifically, the adjuster core 146 nests further into the adjuster base 142 via the tapered edge 176 of the core 146 and tapered rim 180 of the base 142, such that the spring 132 (FIG. 4) pushes the second grind stone 106B down and away from the first grind stone 106A via second spacer 130B. In this position, the protrusions 160 of the central hub 158 of the adjuster base 142 contact the second grind stone 106B and prevent further spacing between the grind stones 106A, 106B. In the coarse grind configuration of FIG. 6B, the gap 116 may be 1.1 mm in some embodiments, or more or less. Comparing the width of gap 116 between FIGS. 6A and 6B shows the difference in grind coarseness. At the same time, the ridges 178 of the click spring 150 move along the teeth or splines 156 of the adjuster base (FIG. 5) to provide feedback to the user regarding the change in position and also assist with ensuring the adjuster assembly is aligned at the correct interval. In this way, the user can selectively vary the grind size of the ground material 111B (FIG. 2).

Figure 7A:
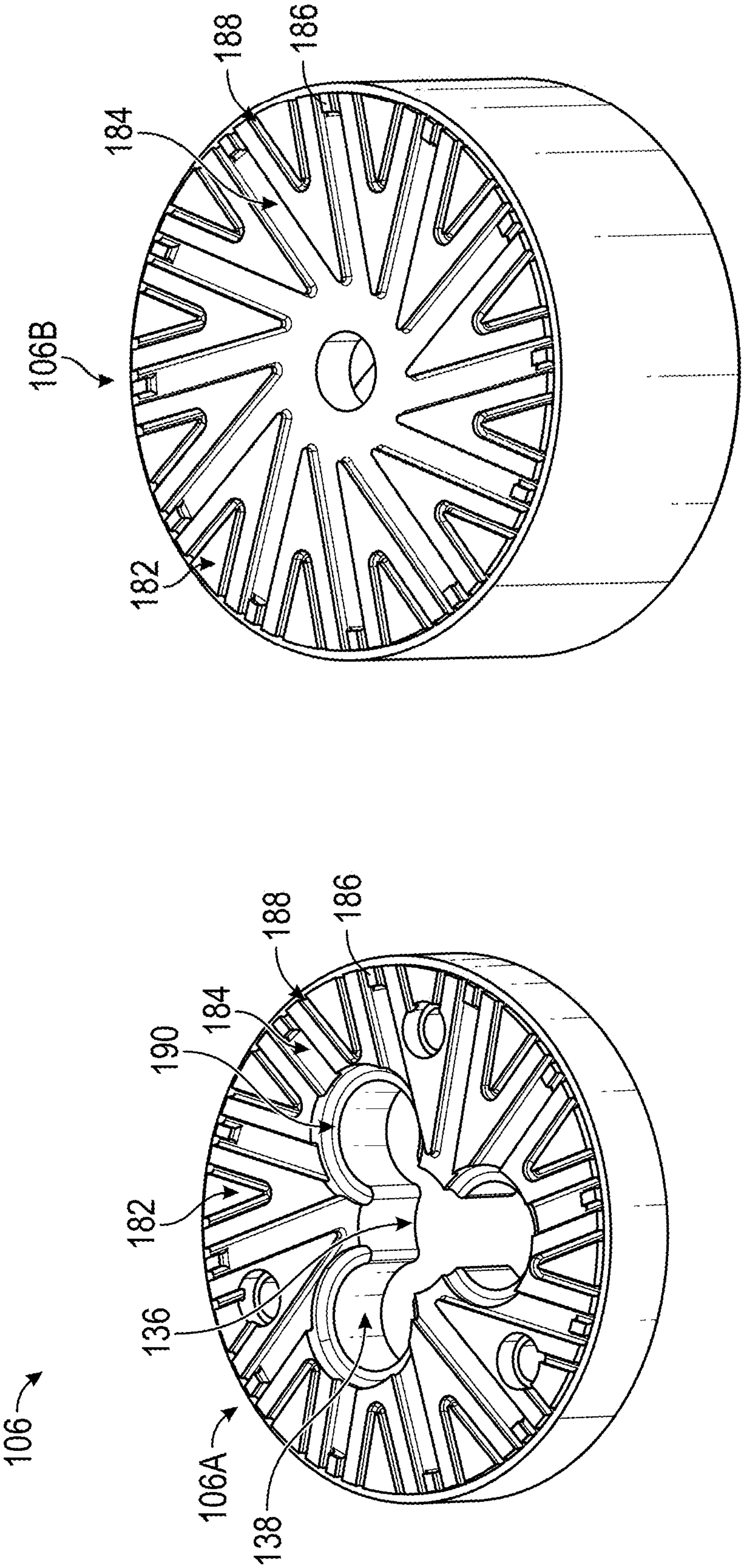
FIG. 7A is an isometric view of a first grind stone and a second grind stone of the spice mill of FIG. 1.

FIG. 7A is an isometric view of the grinding assembly 106, and specifically the grind stones 106A, 106B. In FIG. 7A the grind stones are both positioned with a grind surface 182 facing upwards, whereas in the assembled configuration of the spice mill, the grind surface 182 of the first grind stone 106A is rotated 180 degrees to face the grind surface 182 of the second grind stone 106B. Each of the grind stones 106A, 106B includes a plurality of coarse grind channels 184 in the grind surface 142. The plurality of coarse grind channels 184 may generally be arranged in the same pattern when the grind surfaces 182 of each stone 106A, 106B are facing upwards as in FIG. 7A. Each of the grind surfaces 182 of the stones 106A, 106B is flat and planar in an embodiment to prevent wear in the event the stones 106A, 106B inadvertently contact each other during operation. The coarse grind channels 184 of each grind stone 106A, 106B may generally be straight and rectilinear with each channel 184 arranged at a selected angle and offset relative to a center line in an angled hub and spoke arrangement.

The coarse grind channels 184 may further include islands 186 positioned in the channels 184 proximate an outer end of the channels 184 (e.g. relative to a center of the stones 106A, 106B) to restrict or limit a particle size of the ground material 111B (FIG. 2) exiting the grinding assembly 106. If the particle size is too large to exit through spaces in the islands 186 and the walls of the coarse grind channels 184, the particle will be further ground between the stones 106A, 106B to reduce the particle size. In addition, the islands 186 may assist with preventing ground material from exiting the grinding assembly 106 when the spice mill 100 is set down on a surface, thus limiting additional cleaning before or after use of the spice mill 100. The grind stones further include fine grind channels 188 between successive coarse grind channels 184. The fine grind channels 188 may have an angled "V" shape formed in the grind surface 184 in the protrusions or areas between the coarse grind channels 184. The fine grind channels 188 have a smaller width than the coarse grind channels 184 to further grind particles from the coarse grind channels 184 to a smaller particle size. Because of the smaller size of the fine grind channels 188, the islands 186 may be omitted.

As noted above, the first grind stone 106A includes the central bore 136 and the openings 138 leading into the central bore 136 for the passage of coarse material 111A from the internal cavity 110 of the main body 104 to the grinding assembly 106. The first grind stone 106A may include an initial grind channel 190 implemented as a cavity around each of the openings 138. As shown in FIG. 7A, the initial grind channel 190 may extend around each of the openings 138 on sides of the openings 138 that do not interface with the central bore 136. In other words, the initial grind cavity 190 is only around the openings 138 and is not present on the walls defining the central bore 136 or the sides of the openings 138 that open into the central bore 136 in some embodiments. The initial grind channels 190 have a depth that is greater than the coarse and fine grind channels 184, 188 to assist with initial grinding of the coarse material 111A from the main body 104 (FIG. 2). The initial grind channels 190 may have a depth that corresponds to roughly half of an average sized pepper corn such that the initial grind channels 190 cut the pepper corn (or other spice) in half and feed the initially ground material to the coarse and fine grind channels 184, 188 for further processing. In an embodiment, both stones include the initial grind channels 190, or only the second stone 106B includes the initial grind channels 190 instead of only the first grind stone 106A.

Figure 7B:
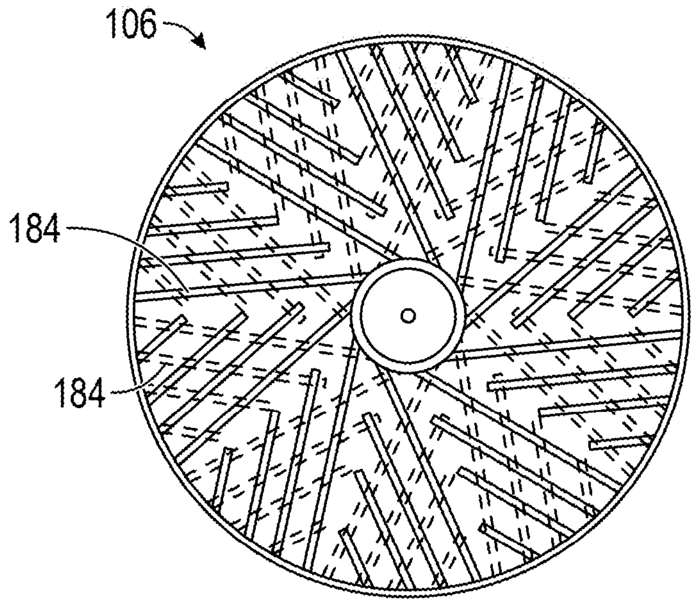
FIG. 7B is a schematic representation of a grinding action of the first grind stone and the second grind stone of FIG. 7A.

FIG. 7B is a schematic representation of a grinding action of the first grind stone 106A and the second grind stone 106B. In FIG. 7B, the grind stones 106A, 106B are represented in the assembled configuration, meaning with the grind surfaces 182 of each grind stone 106A, 106B facing each other (i.e., one grind stone inverted relative to FIG. 7A). In some embodiments, the features of the grind stones 106A, 106B, such as at least the size, shape, and arrangement of the channels 184, 188 may be selected to be different than the non-limiting example of the grind stones shown in FIG. 7A. In FIG. 7B, the grind stones 106A, 106B have straight channels 184, 188 of the same depth and width, but with different lengths. Other configurations are possible. FIG. 7B is provided to demonstrate the grinding action between the stones 106A, 106B and is not intended to limit the different configurations of grind stones 106A, 106B that may be suitable for inclusion in the pepper mill 100. The similar, but inverse pattern of the grind surfaces 182 of the stones 106A, 106B results in a shearing action when the second stone 106B is rotated relative to the first stone that amplifies the offset and angle of the coarse and fine grind channels 184, 188 of FIG. 7B. For example, if one coarse grind channel 184 in the first grind stone 106A is offset approximately 5 mm from a centerline, the corresponding, but inverse coarse grind channel 184 in the second grind stone 106B results in a 10 mm total offset shearing motion when the second stone 106B rotates relative to the first stone 106A to help improve grinding efficiency and consistency.

Figure 8:
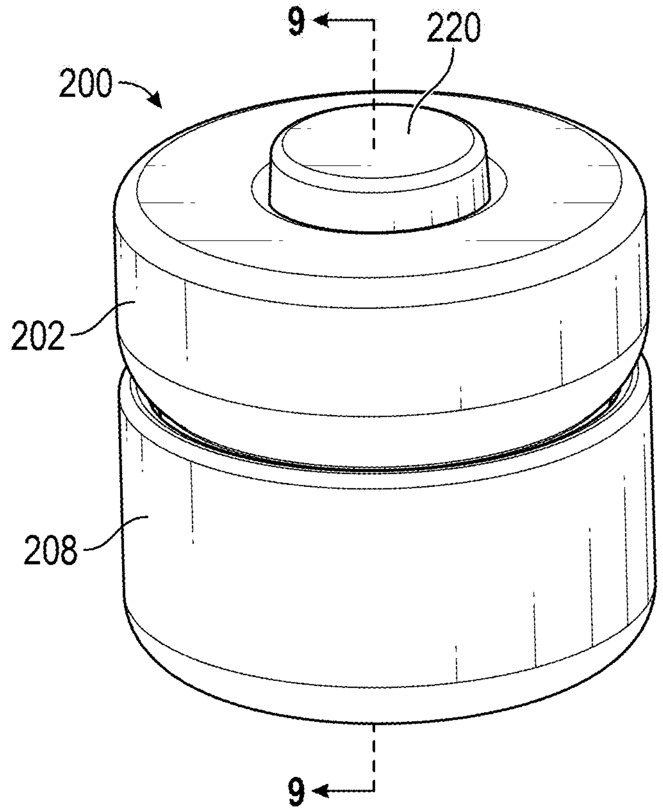
FIG. 8 is an isometric view of a spice mill according to one or more embodiments of the present disclosure.
Figure 9:
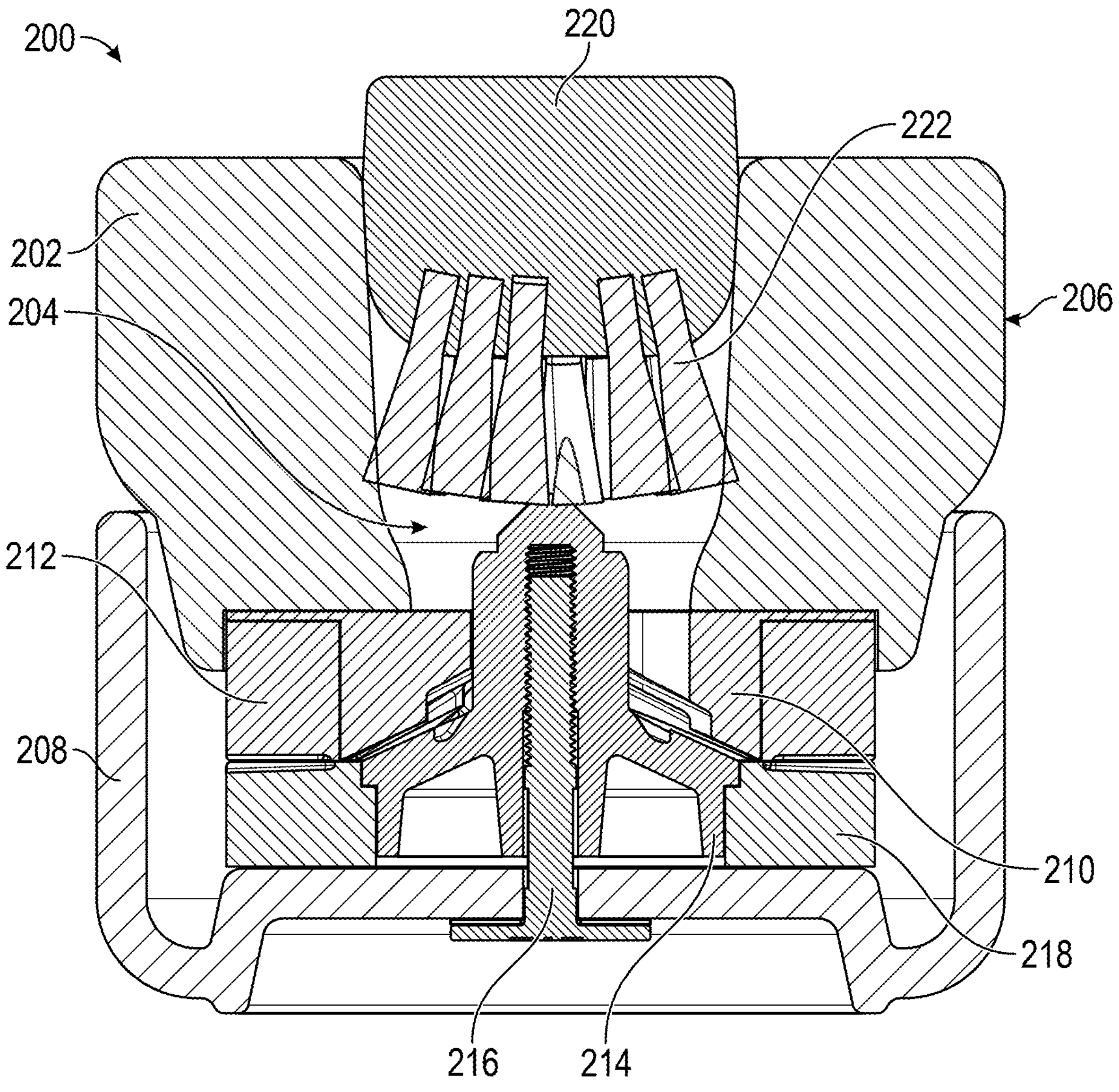
FIG. 9 is a diametric cross-sectional view of the spice mill of FIG. 8 along line 9-9 in FIG. 8.
Figure 10:
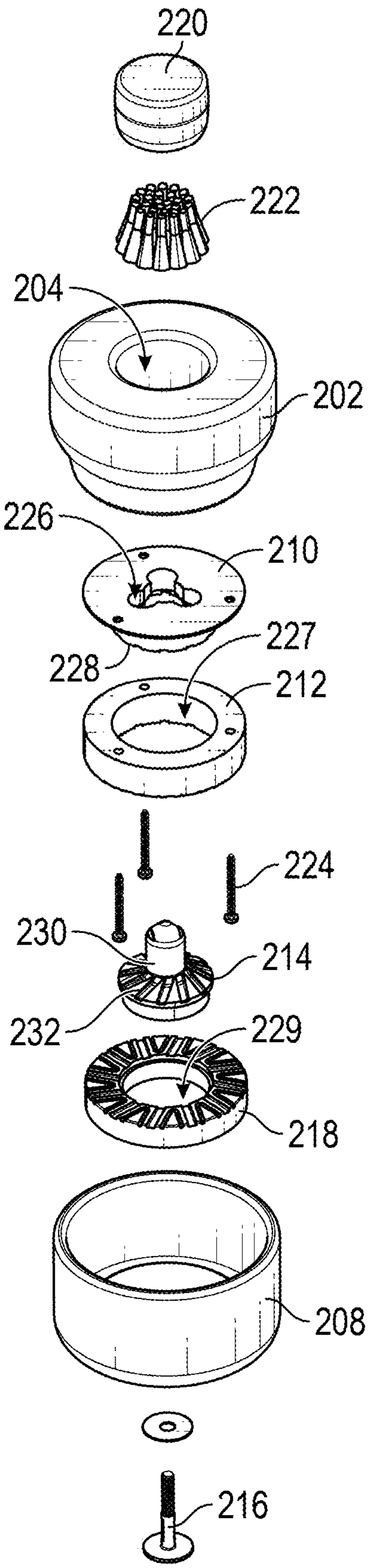
FIG. 10 is an exploded view of the spice mill of FIG. 8.

FIG. 8 is an isometric view of a spice mill 200 according to one or more embodiments of the present disclosure. FIG. 9 is a cross-sectional view of the spice mill 200 along line 9-9 in FIG. 8. FIG. 10 is an exploded view of the spice mill 200. With reference to FIGS. 8-10, the spice mill 200 includes a main body 202 with an internal cavity 204 and a side surface 206, which may be an outer side surface 206. A cup 208 is removably coupled to the main body 202 and surrounds at least a portion, such as a lower portion, of the side surface 206 of the main body 202. The side surface 206 of the main body 202 tapers inward proximate an interface with the cup 208 to assist with engaging the cup 208 and also prevent overtightening of the main body 202 relative to the cup 208. An upper core 210 is coupled to the main body 202 and a first grind stone 212 is coupled to the upper core 210. The spice mill 200 further includes a lower core 214 coupled to the cup 208 with a fastener 216 and a second grind stone 218 coupled to the lower core 214. In an embodiment, the upper core 210 and the first grind stone 212 are a single, integral, unitary component instead of separate pieces and the lower core 214 and the second grind stone 218 are a single, integral, unitary component instead of separate pieces as in FIGS. 8-10. A cap 220 is removably received in the internal cavity 204 of the main body 202 and may include bristles 222 to assist with cleaning the spice mill 200.

The upper core 210 and the first grind stone 212 may be fixed to the main body 202 with fasteners 224 inserted through corresponding holes in the upper core 210 and first grind stone 212. As best shown in FIG. 10 and FIG. 11, the upper core 210 further includes a plurality of openings 226 that allow material received in the internal cavity 204 of the main body 202 to be distributed to the cores 210, 214 and grind stones 212, 218, and the first grind stone 212 includes a central bore 227 that receives and nests with the upper core 210. The upper core 210 also includes teeth 228 on a surface facing the lower core 214 and second grind stone 218. The lower core 214 includes a central protrusion 230 extending through a central one of the openings 226 of the upper core 210 and the central bore 227 of the first grind stone 210. The fastener 216 is received in the protrusion 230 of the lower core 214 to couple the lower core 214 to the cup 208. A lower area of the lower core 214 surrounding a bottom of the protrusion 230 includes further teeth 232 that face the upper core 210. Notably, the teeth 228 of the upper core 210 and the teeth of the lower core 214 are inclined at an angle to horizontal that may be between 5 degrees and 60 degrees, or more preferably between 10 degrees to 45 degrees, among other configurations. Each of the grind stones 212, 218 have channels or teeth that may be similar to grind stones 106A, 106B, except as otherwise provided below. The second grind stone 218 may also include a central bore 229 that nests with the lower core 214.

In operation, a user couples the main body 202 to the cup 208 and removes the cap 220 (along with bristles 222 coupled to the cap 220). The user then inserts a selected material to be ground, such as spices or others, into the open internal cavity 204 of the main body 202 and returns the cap 220 to engagement with the main body 202. The material is distributed to the cores 210, 214 and grind stones 212, 218 via the openings 226 in the first grind stone 210. The user then rotates the main body 202 relative to the cup 208 (either by rotating the main body 202 or by rotating the cup 208, but preferably by rotating the main body 202) to rotate the upper core 210 and first grind stone 212 relative to the lower core 214 and second grind stone 218. As best shown in FIG. 9, a gap or space between the upper core 210 and lower core 214 and their respective teeth 228, 232 is larger than a gap or space between the grind stones 212, 218. Accordingly, the upper core 210 and lower core 214 and their respective teeth 228, 232 initially coarse grind the material. The coarsely ground material is then provided to the grind stones where rotation of the first grind stone 212 relative to the second grind stone 218 reduces the coarse ground material to a fine ground material that is output from sides of the stones 212, 218. The fine ground material is collected in the cup 208, and specifically, in the space between the cup 208 and the grind stones 212, 218 best shown in FIG. 9. The user can then uncouple the main body 202 from the cup 208 to receive the fine ground material and disassemble the spice mill 200 to clean the component parts with the bristles 222 of the cap 220 before grinding another material. As such, the spice mill 200 is particularly well suited to grinding materials of different sizes due to the combination of the initial coarse grinding with the upper and lower cores 210, 214 before fine grinding with the grind stones 212, 218.

Accordingly, the spice mills and grinders of the present disclosure avoid overtightening past a safe point such that grind features contact each other and produce burrs. The concepts of the disclosure also increase grind efficiency and consistency, while either outputting ground material over a wider area, or collecting the ground material for selective use. Further, the mills and grinders of the disclosure can grind a variety of materials of different sizes and compositions with consistent results.

In one or more embodiments, a device may be summarized as including: a spice mill with a top portion, a bottom portion and an external side surface therebetween, the spice mill including a main body with an internal cavity, a first grind component coupled to the main body, and a second grind component coupled to the first grind component, wherein the second grind component is configured to rotate relative to the first grind component to grind a material received from the internal cavity of the main body and discharge the ground material out of the external side surface of the spice mill.

In an embodiment, the spice mill further includes a cap removably coupled to the main body to selectively provide access to the internal cavity.

In an embodiment, the spice mill further includes a snap ring coupled to the main body and interfacing with the cap to facilitate the removable coupling of the cap to the main body.

In an embodiment, the spice mill further includes: a drive shaft extending at least partially through the main body; and a plug coupled to the drive shaft, wherein the cap includes a socket interfacing with the plug to transfer rotary motion of the cap to the drive shaft.

In an embodiment, the spice mill further includes an adjuster assembly coupled to the drive shaft, the adjuster assembly configured to change a position of the second grind component relative to the first grind component, the adjuster assembly including: an adjuster base coupled to the drive shaft, the adjuster base having a rim; an adjuster core coupled to the adjuster base, the adjuster core having a tapered edge interfacing with the rim of the adjuster base; an adjuster bar coupled to the adjuster core; and a click spring received in the adjuster core, wherein the adjuster bar is configured to rotate to move the adjuster core and click spring, and wherein movement of the adjuster core and click spring changes a position of the tapered edge of the adjuster core relative to the rim of the adjuster base to change a position of the second grind component relative to the first grind component.

In an embodiment, the first grind component includes a plurality of channels and a cavity, the cavity having a depth that is greater than a depth of the plurality of first channels.

In an embodiment, the first grind component includes a bore and at least one opening, the cavity of the first grind component extending around at least a portion of an edge of the at least one opening.

In an embodiment, the second grind component includes a plurality of channels arranged in an inverse pattern to the plurality of channels of the first grind component.

In an embodiment, the spice mill further includes: a drive shaft extending at least partially through the main body; a spring coupled to the drive shaft and configured to apply a force to the second grind component; and an agitator coupled to the drive shaft and positioned in the internal cavity of the main body.

In an embodiment, the second grind component is configured to rotate relative to the first grind component to grind the material received from the internal cavity of the main body and output the material from all sides of the outer side surface of the spice mill.

In an embodiment, the first grind component is fixedly coupled to the main body and the second grind component is rotatably coupled to the main body.

In an embodiment, at least one of the first grind component and the second grind component includes a plurality of channels and a plurality of protrusions arranged in the plurality of channels proximate the outer side surface of the spice mill, the plurality of protrusions configured to limit a particle size of the ground material exiting from the outer side surface of the spice mill.

In one or more embodiments, a device may be summarized as including: a main body; a first grind component coupled to the main body, the first grind component including a central opening, a plurality of first channels having a depth, and a cavity extending at least partially around the central opening, the cavity having a depth that is greater than the depth of the plurality of first channels and a second grind component rotatably coupled to the main body, the second grind component including a central opening and a plurality of second channels.

In an embodiment, the plurality of first channels are arranged in a first pattern and the plurality of second channels and are arranged in a second pattern, the first pattern the same as, but inverse to, the second pattern.

In an embodiment, the first grind component has a grind surface facing the second grind component, the grind surface of the first grind component being flat and planar with the plurality of first channels extending into the grind surface of the first grind component.

In an embodiment, the second grind component has a grind surface facing the grind surface of the first grind component, the grind surface of the second grind component being flat and planar with the plurality of second channels extending into the grind surface of the second grind component to prevent wear in response to the grind surface of the second grind component contacting the grind surface of the first grind component.

In an embodiment, the first grind component and the second grind component each have outer side surfaces, the device further comprising a gap between the outer side surfaces of the first grind component and the second grind component, wherein the second grind component is configured to rotate relative to the first grind component to grind a material received from the main body and output ground material from the gap.

In an embodiment, the device further comprises an adjuster assembly coupled to the main body, including: an adjuster base having a rim; an adjuster core coupled to the adjuster base, the adjuster core having a tapered edge interfacing with the rim of the adjuster base; an adjuster bar coupled to the adjuster core; and a click spring received in the adjuster core, wherein the adjuster bar is configured to rotate to move the adjuster core and click spring, and wherein movement of the adjuster core and click spring changes a position of the tapered edge of the adjuster core relative to the rim of the adjuster base to change the size of the gap.

In an embodiment, the device further comprises: an internal cavity in the main body; a cap removably coupled to the main body to selectively provide access to the internal cavity, the cap including a socket; a snap ring coupled to the main body and interfacing with the cap to facilitate the removable coupling of the cap to the main body; a drive shaft extending at least partially through the main body; and a plug coupled to the drive shaft, wherein the socket of the cap is structured to interface with the plug to transfer rotary motion of the cap to the drive shaft.

In an embodiment, a grind surface of at least one of the first grind component and the second grind component is flat and planar.

In an embodiment, at least one of the first grind component and the second grind component includes a plurality of protrusions arranged near ends of the corresponding plurality of first channels and plurality of second channels to restrict a size of a material passing through the corresponding plurality of first channels and plurality of second channels.

In one more embodiments, a device may be summarized as including: a main body; a drive shaft extending at least partially through the main body; a first grind component coupled to the main body; a second grind component coupled to the drive shaft, the second grind component configured to rotate relative to the first grind component via rotation of the drive shaft; and an adjuster assembly coupled to the drive shaft, the adjuster assembly configured to change a position of the second grind component relative to the first grind component, the adjuster assembly including an adjuster base coupled to the drive shaft, the adjuster base having a rim, an adjuster core coupled to the adjuster base, the adjuster core having a tapered edge interfacing with the rim of the adjuster base, and an adjuster bar coupled to the adjuster core, wherein the adjuster bar is configured to rotate the adjuster core, and wherein movement of the adjuster core changes a position of the tapered edge of the adjuster core relative to the rim of the adjuster base to change a position of the second grind component relative to the first grind component.

In an embodiment, at least one of the first grind component and the second grind component has a central opening, a plurality of channels, and a cavity around at least a portion of an edge of the central opening, the cavity having a depth greater than a depth of the plurality of channels.

In an embodiment, at least one of the first grind component and the second grind component includes a plurality of channels and a plurality of protrusions arranged near ends of at least some of the plurality of channels.

In an embodiment, the device further comprises a gap between outer side surfaces of the first grind component and the second grind component, wherein the second grind component is configured to rotate relative to the first grind component to grind a material received from the main body and output ground material from the gap.

In an embodiment, the device further comprises: an internal cavity in the main body; a cap removably coupled to the main body to selectively provide access to the internal cavity, the cap including a socket; a drive shaft extending at least partially through the main body; and a plug coupled to the drive shaft and including at least one opening leading into the internal cavity of the main body, wherein the plug is structured to interface with the socket of the cap to transfer rotary motion of the cap to the drive shaft.

In an embodiment, each of the first grind component and second grind component have flat and planar grind surfaces that face each other.

In an embodiment, the adjuster core includes at least one engagement arm and the adjuster bar includes a channel interfacing with the at least one engagement arm in a snap fit connection.

In an embodiment, the tapered edge of the adjuster core has a height that continuously changes over a length of the tapered edge.

In an embodiment, the adjuster assembly further includes a click spring received in the adjuster core, wherein the adjuster bar is configured to move the click spring with the click spring assisting with changing the position of the tapered edge of the adjuster core.

In one or more embodiments, a device may be summarized as including: a main body with an internal cavity and a side surface; a cup removably coupled to the main body and surrounding at least a portion of the side surface of the main body; an upper core coupled to the main body and having a first opening and first grind teeth; a first grind component coupled to the upper core and having a second opening; a lower core coupled to the cup and including a protrusion extending through the first opening and the second opening, the protrusion including second grind teeth; and a second grind component coupled to the lower core, wherein the upper core is configured to rotate relative to the lower core in response to rotation of the main body to produce a coarse ground material via the first grind teeth of the upper core and the second grind teeth of the lower core, and wherein the first grind component is configured to rotate relative to the second grind component in response to rotation of the main body and the upper core to further grind the coarse ground material into a fine ground material, the fine ground material collected in the cup.

In an embodiment, the device further comprises a cap with a plurality of bristles removably received in the internal cavity of the main body.

The above list of embodiments is non-exclusive and non-limiting, and any of the above embodiments may be modified to include or exclude aspects disclosed herein.

In the above description, certain specific details are set forth in order to provide a thorough understanding of various embodiments of the disclosure. However, one skilled in the art will understand that the disclosure may be practiced without these specific details. In other instances, well-known structures associated with spice mills and spice grinders have not been described in detail to avoid unnecessarily obscuring the descriptions of the embodiments of the present disclosure.

Certain words and phrases used in the specification are set forth as follows. As used throughout this document, including the claims, the singular form “a”, “an”, and “the” include plural references unless indicated otherwise. The terms “include” and “comprise,” as well as derivatives thereof, mean inclusion without limitation. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure. The use of ordinals such as first, second, third, etc., does not necessarily imply a ranked sense of order, but rather may only distinguish between multiple instances of an act or a similar structure or material.

Throughout the specification, claims, and drawings, the following terms take the meaning explicitly associated herein, unless the context clearly dictates otherwise. The term “herein” refers to the specification, claims, and drawings associated with the current application. The phrases “in one embodiment,” “in another embodiment,” “in various embodiments,” “in some embodiments,” “in other embodiments,” and other derivatives thereof refer to one or more features, structures, functions, limitations, or characteristics of the present disclosure, and are not limited to the same or different embodiments unless the context clearly dictates otherwise. As used herein, the term “or” is an inclusive “or” operator, and is equivalent to the phrases “A or B, or both” or “A or B or C, or any combination thereof,” and lists with additional elements are similarly treated. The term “based on” is not exclusive and allows for being based on additional features, functions, aspects, or limitations not described, unless the context clearly dictates otherwise.

Generally, unless otherwise indicated, the materials for making the invention and/or its components may be selected from appropriate materials such as wood, stone, fabric, textiles, composite materials, ceramics, plastic, metal, metal alloys, polymers, foam, plastic compounds, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The terms “top,” “bottom,” “upper,” “lower,” “left,” “right,” and other like derivatives are used only for discussion purposes based on the orientation of the components in the Figures of the present disclosure. These terms are not limiting with respect to the possible orientations explicitly disclosed, implicitly disclosed, or inherently disclosed in the present disclosure and unless the context clearly dictates otherwise, any of the aspects of the embodiments of the disclosure can be arranged in any orientation.

As used herein, the term “substantially” is construed to include an ordinary error range or manufacturing tolerance due to slight differences and variations in manufacturing. Unless the context clearly dictates otherwise, relative terms such as “approximately,” “substantially,” and other derivatives, when used to describe a value, amount, quantity, or dimension, generally refer to a value, amount, quantity, or dimension that is within plus or minus 5% of the stated value, amount, quantity, or dimension. It is to be further understood that any specific dimensions of components or features provided herein are for illustrative purposes only with reference to the various embodiments described herein, and as such, it is expressly contemplated in the present disclosure to include dimensions that are more or less than the dimensions stated, unless the context clearly dictates otherwise.

The present application claims priority to U.S. Provisional Patent Application No. 63/501,871 filed May 12, 2023, the entire contents and disclosure of which are incorporated herein by reference.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described embodiments, but should be defined only in accordance with the following claims and their equivalents.

The invention claimed is:

1. A device, comprising:
- a handheld spice mill including a top portion, a bottom portion and an external side surface,
- the spice mill further including:
  - a main body with an internal cavity;
  - a first grind component coupled to the main body; and
  - a second grind component coupled to the first grind component, wherein an external side surface of the first grind component and an external side surface of the second grind component form part of the external side surface of the spice mill,
- wherein the second grind component is configured to rotate relative to the first grind component to grind a material received from the internal cavity of the main body and discharge the ground material out from between the external side surfaces of the first and second grind components.

2. The device of claim 1, wherein the spice mill further includes:
- a drive shaft extending at least partially through the main body;
- a plug coupled to the drive shaft; and
- a cap including a socket interfacing with the plug to transfer rotary motion of the cap to the drive shaft.

3. The device of claim 2, wherein the spice mill further includes:
- an adjuster assembly coupled to the drive shaft, the adjuster assembly configured to change a position of the second grind component relative to the first grind component, the adjuster assembly including:
  - an adjuster base coupled to the drive shaft, the adjuster base having a rim;
  - an adjuster core coupled to the adjuster base, the adjuster core having a tapered edge interfacing with the rim of the adjuster base;
  - an adjuster bar coupled to the adjuster core; and
  - a click spring received in the adjuster core,
  - wherein the adjuster bar is configured to rotate to move the adjuster core and click spring,
  - wherein movement of the adjuster core and click spring changes a position of the tapered edge of the adjuster core relative to the rim of the adjuster base to change a position of the second grind component relative to the first grind component.

4. The device of claim 1, wherein the first grind component includes a plurality of first channels and a cavity, the cavity having a depth that is greater than a depth of the plurality of first channels.

5. The device of claim 4, wherein the first grind component includes a bore and at least one opening, the cavity of the first grind component extending around at least a portion of an edge of the at least one opening.

6. The device of claim 1, wherein the second grind component is configured to rotate relative to the first grind component to grind the material received from the internal cavity of the main body and output the material from all sides of the external side surface of the spice mill.

7. A device, comprising:
- a main body;
- a first grind component coupled to the main body, the first grind component including:
  - a central opening;
  - a plurality of first channels having a depth; and
  - a cavity extending at least partially around the central opening, the cavity having a depth that is greater than the depth of the plurality of first channels; and
- a second grind component rotatably coupled to the main body, the second grind component including:
  - a central opening; and
  - a plurality of second channels; and
- an adjuster assembly coupled to the main body, including:
  - an adjuster base having a rim;
  - an adjuster core coupled to the adjuster base, the adjuster core having a tapered edge interfacing with the rim of the adjuster base;
  - an adjuster bar coupled to the adjuster core; and
  - a click spring received in the adjuster core.

8. The device of claim 7, wherein the plurality of first channels are arranged in a first pattern and the plurality of second channels and are arranged in a second pattern, the first pattern the same as, but inverse to, the second pattern.

9. The device of claim 7, wherein the first grind component has a grind surface facing the second grind component, the grind surface of the first grind component being planar with the plurality of first channels extending into the grind surface of the first grind component.

10. The device of claim 9, wherein the second grind component has a grind surface facing the grind surface of the first grind component, the grind surface of the second grind component being planar with the plurality of second channels extending into the grind surface of the second grind component to prevent wear in response to the grind surface of the second grind component contacting the grind surface of the first grind component.

11. The device of claim 7, wherein the first grind component and the second grind component each have outer side surfaces, the device further comprising:
- a gap between the outer side surfaces of the first grind component and the second grind component, wherein the second grind component is configured to rotate relative to the first grind component to grind a material received from the main body and output ground material from the gap.

12. The device of claim 11, wherein the adjuster bar is configured to rotate to move the adjuster core and click spring, and wherein movement of the adjuster core and click spring changes a position of the tapered edge of the adjuster core relative to the rim of the adjuster base to change a size of the gap.

13. The device of claim 7, further comprising:

an internal cavity in the main body;

a cap removably coupled to the main body to selectively provide access to the internal cavity, the cap including a socket;

a snap ring coupled to the main body and interfacing with the cap to facilitate removable coupling of the cap to the main body;

a drive shaft extending at least partially through the main body; and a plug coupled to the drive shaft, wherein the socket of the cap is structured to interface with the plug to transfer rotary motion of the cap to the drive shaft.

14. The device of claim 7, wherein at least one of the first grind component and the second grind component includes a plurality of protrusions arranged adjacent ends of the corresponding plurality of first channels and plurality of second channels to restrict a size of a material passing through the corresponding plurality of first channels and plurality of second channels.

15. A device, comprising:

a main body;

a drive shaft extending at least partially through the main body;

a first grind component coupled to the main body;

a second grind component coupled to the drive shaft, the second grind component configured to rotate relative to the first grind component via rotation of the drive shaft; and an adjuster assembly coupled to the drive shaft, the adjuster assembly configured to change a position of the second grind component relative to the first grind component, the adjuster assembly including:

an adjuster base coupled to the drive shaft, the adjuster base having a rim;

an adjuster core coupled to the adjuster base, the adjuster core having a tapered edge interfacing with the rim of the adjuster base; and an adjuster bar coupled to the adjuster core, wherein the adjuster bar is configured to rotate the adjuster core, and wherein movement of the adjuster core changes a position of the tapered edge of the adjuster core relative to the rim of the adjuster base to change a position of the second grind component relative to the first grind component; and wherein at least one of the first grind component and the second grind component has a central opening, a plurality of channels, and a cavity around at least a portion of an edge of the central opening, the cavity having a depth greater than a depth of the plurality of channels.

16. The device of claim 15, wherein at least one of the first grind component and the second grind component has a central opening, a plurality of channels, and a cavity around at least a portion of an edge of the central opening, the cavity having a depth greater than a depth of the plurality of channels.

17. The device of claim 15, wherein at least one of the first grind component and the second grind component includes a plurality of channels and a plurality of protrusions arranged adjacent ends of at least some of the plurality of channels.

18. The device of claim 15, further comprising:

a gap between outer side surfaces of the first grind component and the second grind component, wherein the second grind component is configured to rotate relative to the first grind component to grind a material received from the main body and output ground material from the gap.

19. The device of claim 15, wherein the adjuster core includes at least one engagement arm and the adjuster bar includes a channel interfacing with the at least one engagement arm in a snap fit connection.

20. The device of claim 15, wherein the tapered edge of the adjuster core has a height that continuously changes over a length of the tapered edge.

* * * * *